United States Patent
Ogura (10) Patent No.: US 10,719,794 B2
(45) Date of Patent: Jul. 21, 2020

(54) OPERATION SUPPORT APPARATUS, OPERATION SUPPORT METHOD, AND NON-TRANSITORY COMPUTER READABLE MEDIUM STORING PROGRAM

(71) Applicant: FUJI XEROX CO., LTD., Tokyo (JP)

(72) Inventor: Takeshi Ogura, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 974 days.

(21) Appl. No.: 15/243,979

(22) Filed: Aug. 23, 2016

(65) Prior Publication Data

US 2017/0278036 A1 Sep. 28, 2017

(30) Foreign Application Priority Data

Mar. 28, 2016 (JP) ................................. 2016-063656

(51) Int. Cl.
*G06Q 10/06* (2012.01)
(52) U.S. Cl.
CPC .............................. *G06Q 10/06313* (2013.01)
(58) Field of Classification Search
CPC ................... G06Q 10/06313; H04M 2203/051
See application file for complete search history.

(56) References Cited

U.S. PATENT DOCUMENTS

| | | | | |
|---|---|---|---|---|
| 2009/0204667 | A1* | 8/2009 | Diaz | G06F 11/0742 709/203 |
| 2014/0336795 | A1* | 11/2014 | Asenjo | G05B 19/4083 700/86 |
| 2015/0156065 | A1* | 6/2015 | Grandhe | H04L 41/5054 709/224 |
| 2019/0347368 | A1* | 11/2019 | Duff | G02B 27/0093 |

FOREIGN PATENT DOCUMENTS

| | | |
|---|---|---|
| JP | 2006350681 | 12/2006 |
| JP | 2010-113421 | 5/2010 |
| JP | 2011-018333 | 1/2011 |
| JP | 2011248761 | 12/2011 |
| JP | 2015158914 | 9/2015 |

OTHER PUBLICATIONS

"Office Action of Japan Counterpart Application," with machine English translation thereof, dated Jan. 21, 2020, p. 1-p. 8.

* cited by examiner

*Primary Examiner* — Michael Won
(74) *Attorney, Agent, or Firm* — JCIPRNET (57) ABSTRACT

An operation support apparatus includes a receiving unit that receives a file and environment information from a terminal, the file pertaining to operation support received by a user of the terminal, the environment information indicating an operation environment of the terminal, a screen generator that generates image data of a screen referenced when performing the operation support based on the received file and environment information, and an output unit that outputs the generated image data.

12 Claims, 6 Drawing Sheets

| SOFTWARE NAME | VERSION | VENDOR |
|---|---|---|
| Windows10 Enterprise N | 10.0.0 | MICROSOFT |
| MS Office 2013 | 2013 | MICROSOFT |
| Adobe Acrobat X | 10.0.0 | ADOBE |

FIG. 4

| ASSET ID | ABCDEFG |
|---|---|
| OS | Windows10 Enterprise N(64 bit) |
| ASSET NAME | Win10Desktop |
| SYSTEM MODEL | Xyz Lifebook |
| CPU | Intel(R)Core(TM)i7 4712MQ CPU @2.30GHz |
| MEMORY | 2.00GB |
| VIDEO CARD | Intel® HD Graphics 4600 |

| BRANCH | SALES | ACCUMULATED SALES |
|---|---|---|
| HOKKAIDO | 1,000,000 | |
| TOKYO | 3,000,000 | |
| OSAKA | 2,000,000 | |
| TOTAL | | |

| # | OS | MS OFFICE VERSION | BROWSER | MAIL SOFTWARE | IMAGE FILE |
|---|---|---|---|---|---|
| 001 | MS Windows 7 | 2010 | IE 11 | Outlook | IM1 |
| 002 | MS Windows 7 | 2010 | IE 11 | Thunderbird | IM2 |
| 003 | MS Windows 7 | 2010 | Chrome | Outlook | IM3 |
| 004 | MS Windows 7 | 2010 | Chrome | Thunderbird | IM4 |
| 005 | MS Windows 7 | 2013 | IE 11 | Outlook | IM5 |
| 006 | MS Windows 7 | 2013 | IE 11 | Thunderbird | IM6 |
| 007 | MS Windows 7 | 2013 | Chrome | Outlook | IM7 |
| 008 | MS Windows 7 | 2013 | Chrome | Thunderbird | IM8 |
| 009 | MS Windows 8.1 | 2010 | IE 11 | Outlook | IM9 |
| 010 | MS Windows 8.1 | 2010 | IE 11 | Thunderbird | IM10 |
| 011 | MS Windows 8.1 | 2010 | Chrome | Outlook | IM11 |
| 012 | MS Windows 8.1 | 2010 | Chrome | Thunderbird | IM12 |
| 013 | MS Windows 8.1 | 2013 | IE 11 | Outlook | IM13 |
| 014 | MS Windows 8.1 | 2013 | IE 11 | Thunderbird | IM14 |
| 015 | MS Windows 8.1 | 2013 | Chrome | Outlook | IM15 |
| 016 | MS Windows 8.1 | 2013 | Chrome | Thunderbird | IM16 |

| BRANCH | SALES | ACCUMULATED SALES |
|---|---|---|
| REGION A | 1,234,567 | |
| REGION B | 3,210,987 | |
| REGION C | 2,345,678 | |
| TOTAL | | |

OPERATION SUPPORT APPARATUS, OPERATION SUPPORT METHOD, AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2016-063656 filed Mar. 28, 2016.

BACKGROUND (i) Technical Field

The invention relates to a technology that supports operations of a user.

SUMMARY

According to an aspect of the invention, there may be provided an operation support apparatus, including: a receiving unit that receives a file and environment information from a terminal, the file pertaining to operation support received by a user of the terminal, the environment information indicating an operation environment of the terminal from the terminal; a screen generator that generates image data of a screen referenced when performing the operation support based on the received file and environment information; and an output unit that outputs the generated image data.

BRIEF DESCRIPTION OF THE DRAWINGS

Exemplary embodiments of the present invention will be described in detail based on the following figures, wherein.

DETAILED DESCRIPTION

Figure 1:
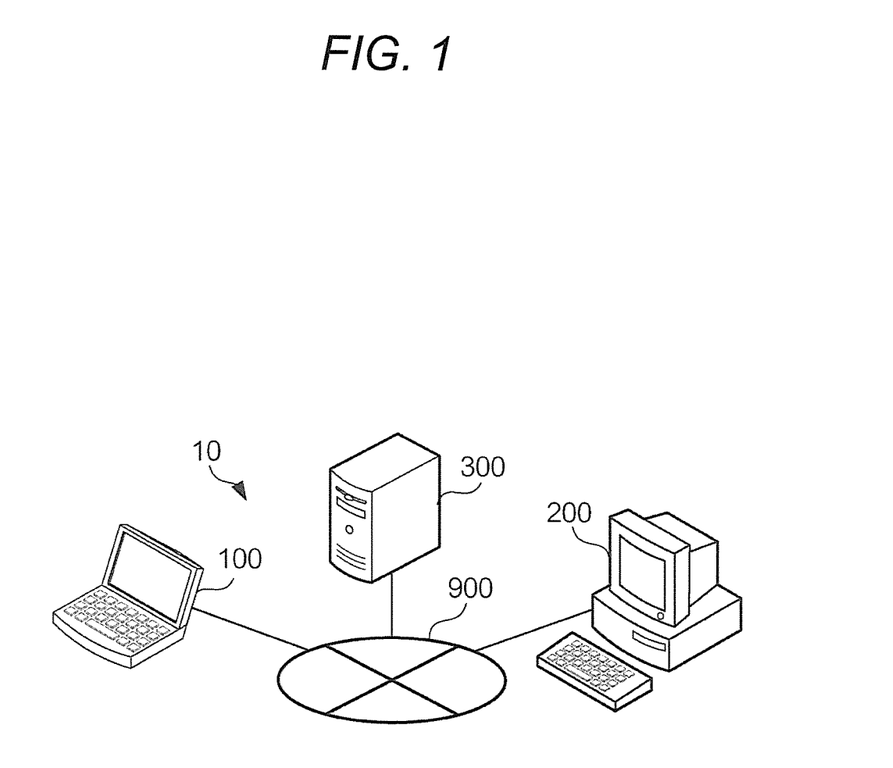
FIG. 1 is a drawing illustrating an overview of the operation support system.

FIG. 1 illustrates an overview of the operation support system 10. The operation support system 10 includes a user terminal 100, a support agent terminal 200, and a management device 300. The management device 300 is connected to the user terminal 100 and the support agent terminal 200 via the Internet 900. The user terminal 100 is used by a user that receives operation support related to a computer and is an information processing apparatus such as a personal computer, a tablet PC, or a note-type PC. Examples of operation support include an expert (support agent) considering the method of using an application program or the like for a beginner, for example, considering the method of using the SUM function or Pivot tables in a spreadsheet software as an example.

The support agent terminal 200 is a general-purpose computer device, such as a personal computer or tablet PC that is installed in a support center and is used by a user (operator, support agent) different to the user (person receiving support) of the user terminal 100. The support agent ascertains the content of a question of a user using a telephone or the like and vocally returns the content of a response to the use while viewing a screen displayed on the support agent terminal 200 based on screen data provided from the management device 300. The virtual environment of the user terminal 100 constructed, as necessary, on the management device 300 is accessed, operations obtained by the user are input by the support agent terminal 200, and image data in which the results of the operation provided from the management device 300 is received and verified on the screen of the support agent terminal 200. It should be noted that in a case where the operation content performed by the support agent terminal 200 is transmitted to the user terminal 100, exchanges on the telephone or the like are not described.

The management device 300 is a server that is managed by the support center and transmits the information in which the operation environment of the user terminal 100 is reflected and that is provided to the provided in the operation support to at least one of either the user terminal 100 and the support agent terminal 200.

Figure 2:
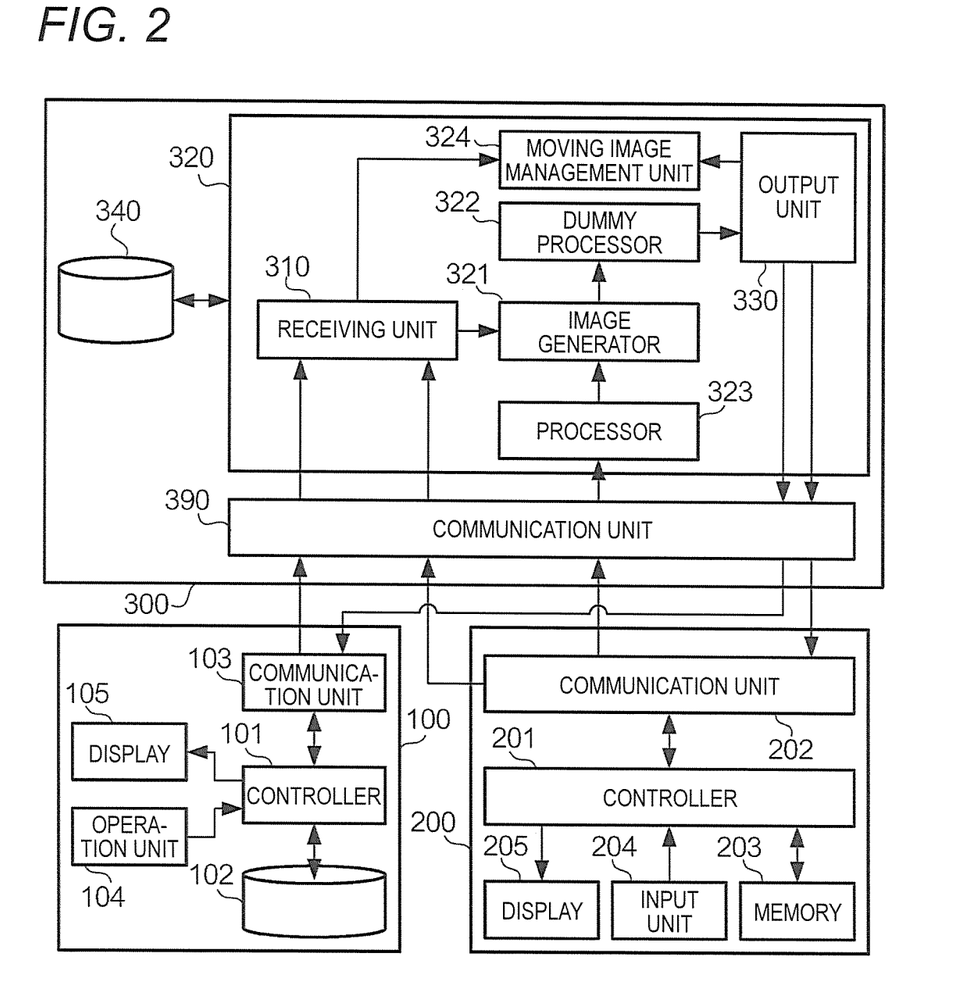
FIG. 2 is a drawing illustrating the functions of a user terminal, a support agent terminal, and a management device.

FIG. 2 illustrates an overview of the operation support system 10. The user terminal 100 includes a controller 101, a memory 102, a communication unit 103, an operation unit 104, and a display 105. The controller 101 is a processor such as a CPU and controls the memory 102, the communication unit 103, the operation unit 104, and the display 105.

The memory 102 is a storage device such as a semiconductor memory or hard disk, and in which environment information, application programs (below, simply referred to as an application) capable of being an operation support object while operating on the operating system (OS), and files (referred to as support object files) for execution by the application are stored in addition to the OS.

Environment information is broadly divided into software information AS1 and hardware information AS2. The software information AS1 is necessarily included in the environment information, and the hardware information AS2 may be omitted.

Figure 3:
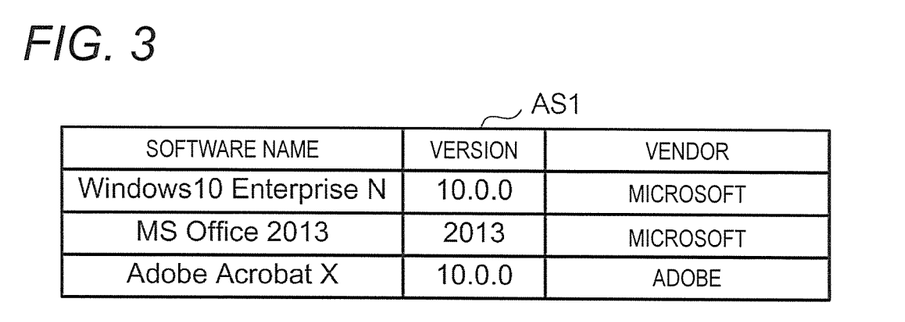
FIG. 3 is a drawing illustrating an example of software information.

The software information AS1 is information pertaining to the software resources of the user terminal 100 and that exerts an influence on the display content of the screen. For example, as illustrated in FIG. 3, information identifying the OS or middleware, information identifying the installed applications, and detailed information of the applications (version, date of latest update, and the like) are included in the software information AS1. The detailed information, such as the version, is leveraged since there are cases according to the application where the user interface (screen design) differs when the version is different and it is difficult for the support agent to accurately transfer the operation procedure when the version used by the user is not specified. The wording "application" is an application that executes functions, such as spreadsheets, document creation, slide creation for presentations, application for other business applications, image editing, audio reproduction and the like, and the function of the application is not particularly limited.

Figure 4:
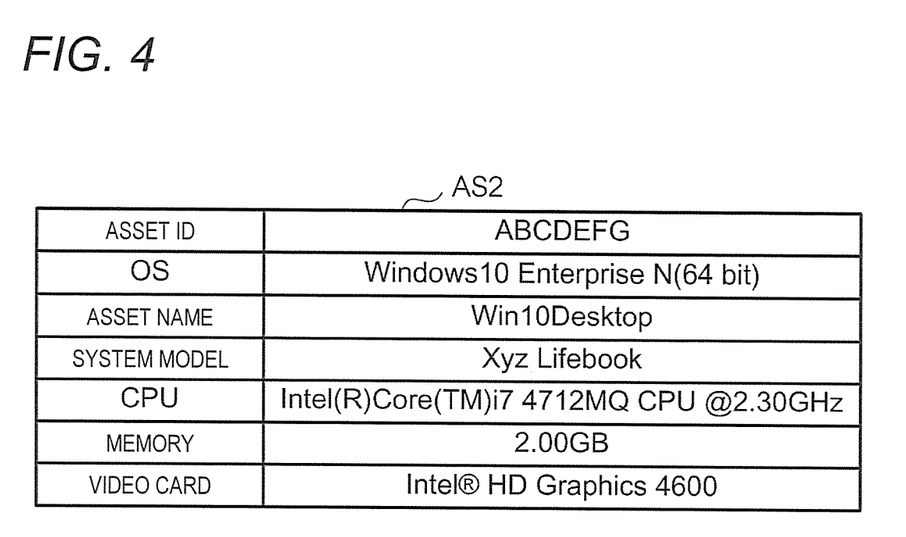
FIG. 4 is a drawing illustrating an example of hardware information.

The hardware information AS2 is information pertaining to the hardware resources of the terminal, and although not necessarily related to the display content of the screen, is a parameter that exerts an influence on the processing speed, such as drawing, and the operation feeling of the user. For example, as illustrated in FIG. 4, the number of CPU cycles or the capacity of mounted memory is included in the hardware information AS2.

Figure 5:
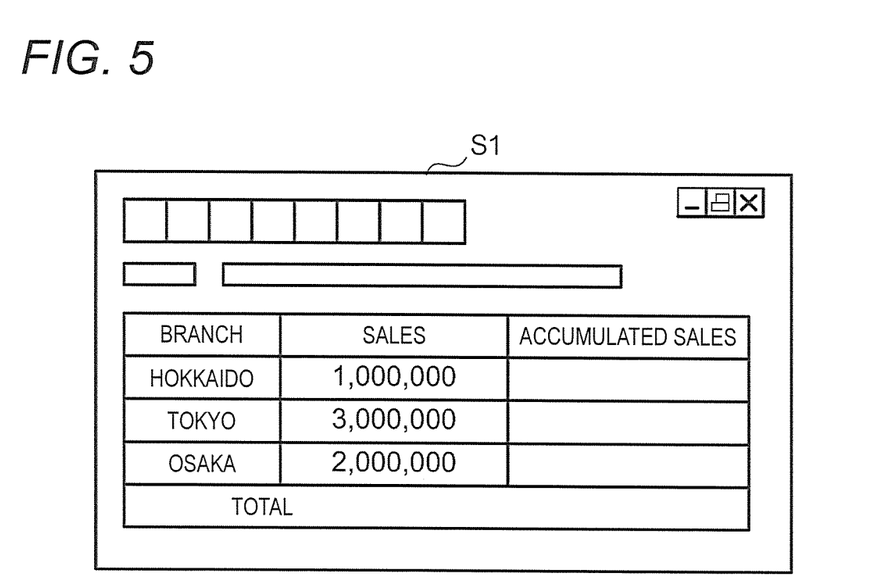
FIG. 5 is a drawing illustrating an example of a screen.

The display 105 is a display device that includes an image signal processing circuit, a liquid crystal screen, and the like and that displays the execution results of an application or the like. FIG. 5 illustrates an example of S1 displayed on the display 105 when the support object file started up by a spreadsheet application is read. For a user who does not understand how to use the SUM function, rather than simply displaying the operation procedure while starting up the application, it is easier to apply and display actual data than to image the operation procedure or method of use.

The operation unit 104 is a mouse, keyboard, stylus, touch panel or other input device and is operated by the user. The communication unit 103 is a communication module, such as a LAN card, that performs communication with the management device 300 in a wired or wireless manner.

Returning to FIG. 2, although the support agent terminal 200 is the same as the user terminal 100 on the feature of having a function of a personal computer as a primary function, it is not necessary to have the same software resources and hardware resources as the user terminal 100. The features that differ from the user terminal 100 are that the support agent terminal 200 performs input to the virtual environment constructed on the management device 300 and acquires responses from the virtual environment with respect to the input.

The support agent terminal 200 includes a controller 201, a communication unit 202, a memory 203, an input unit 204, and a display 205. The controller 201 is a processor such as a CPU and controls the communication unit 202, the memory 203, the input unit 204, and the display 205. The communication unit 202 is a communication interface for transmitting and receiving information with the management device 300. The memory 203 is a storage device such as a hard disk or semiconductor memory, stores a remote control application for accessing the virtual application constructed on the management device 300 in addition to the operating system (OS). The input unit 204 is a mouse, keyboard, stylus, touch panel or other input device, and is used by the operation support agent. The information that indicates the operated content is provided to the management device 300. The display 205 is a display device that includes an image signal processing circuit, a liquid crystal screen, and the like and that displays images based on the image data acquired from the management device 300.

In FIG. 2, the management device 300 includes a controller 320, a memory 340, and a communication unit 390. The communication unit 390 is a communication module, such as a LAN card, that exchanges information with at least either of the user terminal 100 or the support agent terminal 200 in a wired or wireless manner.

The memory 340 is storage device such as a hard disk or a semiconductor memory, and stores programs such as VMware (registered trademark) for constructing the virtual environment to be used by the support agent terminal 200 and executed by the processor 323, applications that operate in the virtual environment, the table T1 that is executed by the screen generator 321 and reference when constructing the screen according to the environment of the user terminal 100, and image files used when generating the screen data, in addition to the OS of the management device 300. Image data of an updated screen reflecting the operation support of the support agent terminal 200 is sequentially stored in the memory 340. Additionally, programs for dummy conversion of screen data used by the dummy processor 322 and programs that analyze the operation content executed by the moving image management unit 324 are stored in the memory 340.

Figure 6:
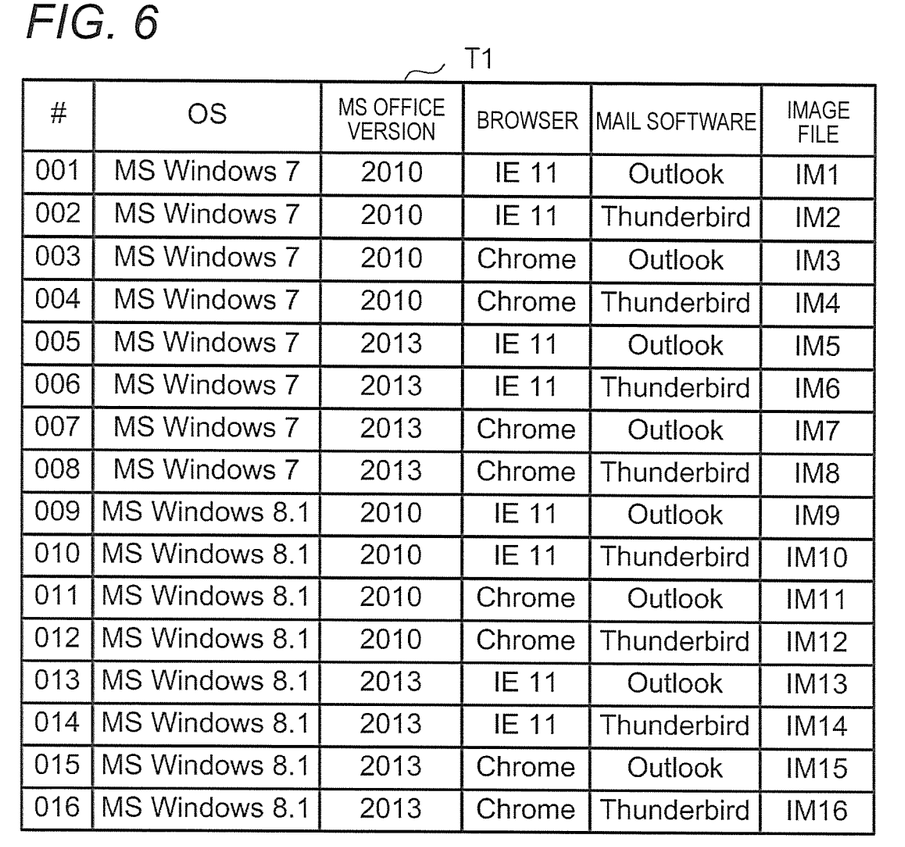
FIG. 6 is a drawing illustrating an example of a table.

FIG. 6 illustrates an example of the table T1. The table T1 designates one image file in response to a combination of elements that form the software information AS1. In a preferable form, the combination all versions of the OS or main applications, browser, and versions of the mail software are encompassed in table 1. Accordingly, it is possible to duplicate substantially the same screen on the support agent terminal 200 as the screen displayed on the user terminal 100 (screen actually viewed by the user) in any operating environment of the user terminal 100. It is not necessary that the screen generated be a screen that most approximates the screen actually displayed on the user terminal 100, and, in summary, at least one screen suitably to support may be determined in a case where a support object file in the operation environment specified by the software information AS1 is executed.

Returning to FIG. 2, the controller 320 is mounted as one general-purpose processor or a cluster of various dedicated processor modules, and includes a receiving unit 310, a screen generator 321, a dummy processor 322, a processor 323, a moving image management unit 324, and an output unit 330. The receiving unit 310 receives the support object file and the environment information from the user terminal 100. In addition, when the receiving unit 310 receives information for specifying the content of the operation support from the user terminal 100 or the support agent terminal 200 prior to the acquisition of the support object file and the environment information, the information is supplied to the moving image management unit 324.

The processor 323 constructs the virtual environment of the user terminal 100 for utilization by the support agent terminal 200 based on the hardware information AS2 supplied from the receiving unit 310 on the management device 300. An access request is received from the support agent terminal 200, the drawing content in which the content input by the support agent terminal 200 is determined, and output to the screen generator 321.

The screen generator 321 generates image data of the screen referenced when performing operation support based on the support object file and software information AS1 acquired by the receiving unit 310. Specifically, the screen generator 321 references the table T1 stored in the memory 340, specifies the main applications (OS, version of business applications, browser, and mail software) installed on the user terminal 100, and selects one item of image data that represents the screen estimated to be most similar to the screen when the combination of applications is executed. In the case of the content of the table T1 illustrated in FIG. 6, the image file IM7 corresponding to the combination "007" in a case where the image data is formed so that the OS is Win 7, the business application is Office 2013 (registered trademark), the browser is Chrome (registered trademark), and the mailer is Outlook (registered trademark) on the user terminal 100. The screen generator 321 reads the image file IM7 from the memory 340 and generates the estimated screen when the displayed on the user terminal 100 in a case where the support object file is executed in the above-described configuration. The screen generator 321 receives information indicating the operation realized on the support agent terminal 200 from the processor 323 and updates the image data so that the operation is reflected on the screen. The screen data generated by the screen generator 321 is output to the dummy processor 322.

Figure 7:
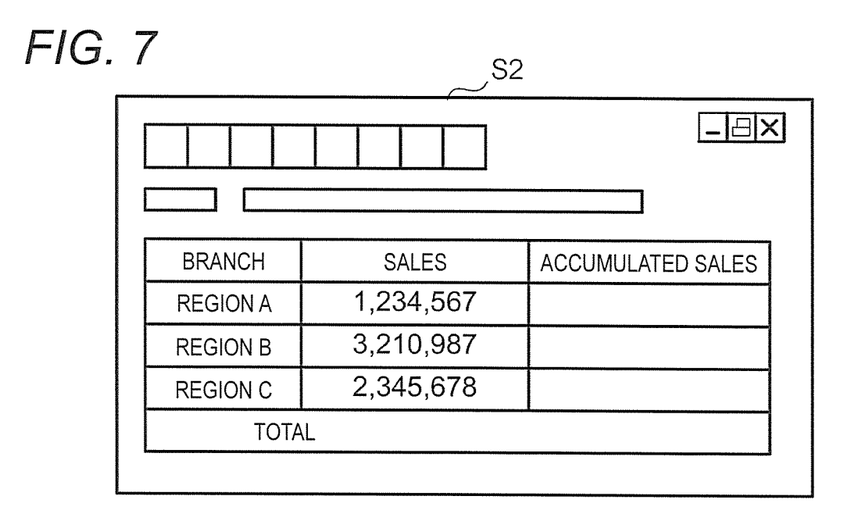
FIG. 7 is a drawing illustrating an example dummy converted data.

The dummy processor 322 dummy converts the locations necessary in the image data supplied from the screen generator 321. The wording "dummy conversion" refers to converting at least a portion of information included in the support object file to other information such as converting specific character strings to other character strings (including white space) or carrying out conversion processing such as encryption according to a predetermined algorithm. FIG. 7 illustrates an example S2 of a screen where dummy conversion is carried out on the image data. In the example, registered proper names are converted to predetermined characters and numbers are converted to random values as conversion rules. In summary, content not to be visible to the support agent in the content of information viewed on the user terminal 100 may be hidden by dummy conversion. Thus, in a case where there is no information to be hidden, the dummy processor 322 determines that the dummy conversion is unnecessary, and may output the image data supplied from the screen generator 321 to the output unit 330 as it is. The image data processed by the dummy processor 322 is supplied to the output unit 330.

The output unit 330 transmits the image data supplied from the dummy processor 322 as data of the virtual image to at least one of the user terminal 100 and the support agent terminal 200 via the communication unit 390. Even in a case of transmitting to only the support agent terminal 200, a situation such as the support agent being able to input the operation with the support agent terminal 200 while transferring the operation content by telephone or the like functions as support. Even in a case of transmitting to only the user terminal 100, a situation such as the support agent performing the operation with the support agent terminal 200 in the vicinity of the user while viewing the screen of the user terminal 100 together with the user functions as support. In addition, the output unit 330 outputs the image data supplied from the dummy processor 322 to the moving image management unit 324.

In a case of performing the dummy conversion process, the output unit 330 may output both of the data subjected to dummy conversion and the data before being subjected. Whereas the dummy converted data is transmitted to the support agent terminal 200, the unconverted data is transmitted to the user terminal 100. This is because it is not necessary to consider problems in security in the data transmitted to the user terminal 100, and there are cases where it is thought better that the operation content is verified by the support agent terminal 200 with the screen not subjected to dummy conversion by the user of the user terminal 100. Alternatively, the dummy converted data and the unconverted data may both be transmitted to the user terminal 100. In this case, it is possible for the user terminal 100 to verify the same screen content as the screen viewed by the support agent terminal 200 on the user terminal 100. In short, the screen provided in operation support of the user in which the operation environment of the user terminal 100 is reflected may be provided to the support agent.

The moving image management unit 324 generates one moving image data item based on the series of screen data items supplied from the output unit 330, and stores the moving image data associated with the information indicating the operation content in the memory 340. In addition, the moving image management unit 324 specifies the support content according to the request supplied from the receiving unit 310, determines whether the moving image associated with the operation content corresponding to the specified support content is stored in the memory 340, and extracts the moving image from the memory 340 in a case where the corresponding moving image is present. The extracted moving image data is output to the output unit 330 and is transmitted to the user terminal 100 via the communication unit 390.

Specifically, it is preferable that the moving image management unit 324 applies tag information (keyword) to the moving image support object file so that it is possible to specify whether the operation support represented by the moving image pertains to "in which version" of "which application", "which scene is assumed" and "the method of using which function". For example, if the moving image pertains to the method of using the SUM function with the calculation of gross sales in MS Office 2013 Excel as an object, the "MS Excel", "MS Office 2013", "Sales Calculation", and "SUM Function" are applied as four items of tag information.

The determination of the tag information is performed by the user transferring content to be supported (for example, "I would like to you to show me how to use the SUM function in MS Office 2013 Excel with the goal of calculating gross sales") to an operator using a telephone or the like, the operator carrying out a voice identification process with personal judgment or on the voice of the telephone, and extracting the characteristic terms included in the content. The tag information is transmitted from the support agent terminal 200 to the management device 300 with the support request, and is acquired by the receiving unit 310. Alternatively, the information may be transmitted from the user terminal 100 to the management device 300.

Figure 8:
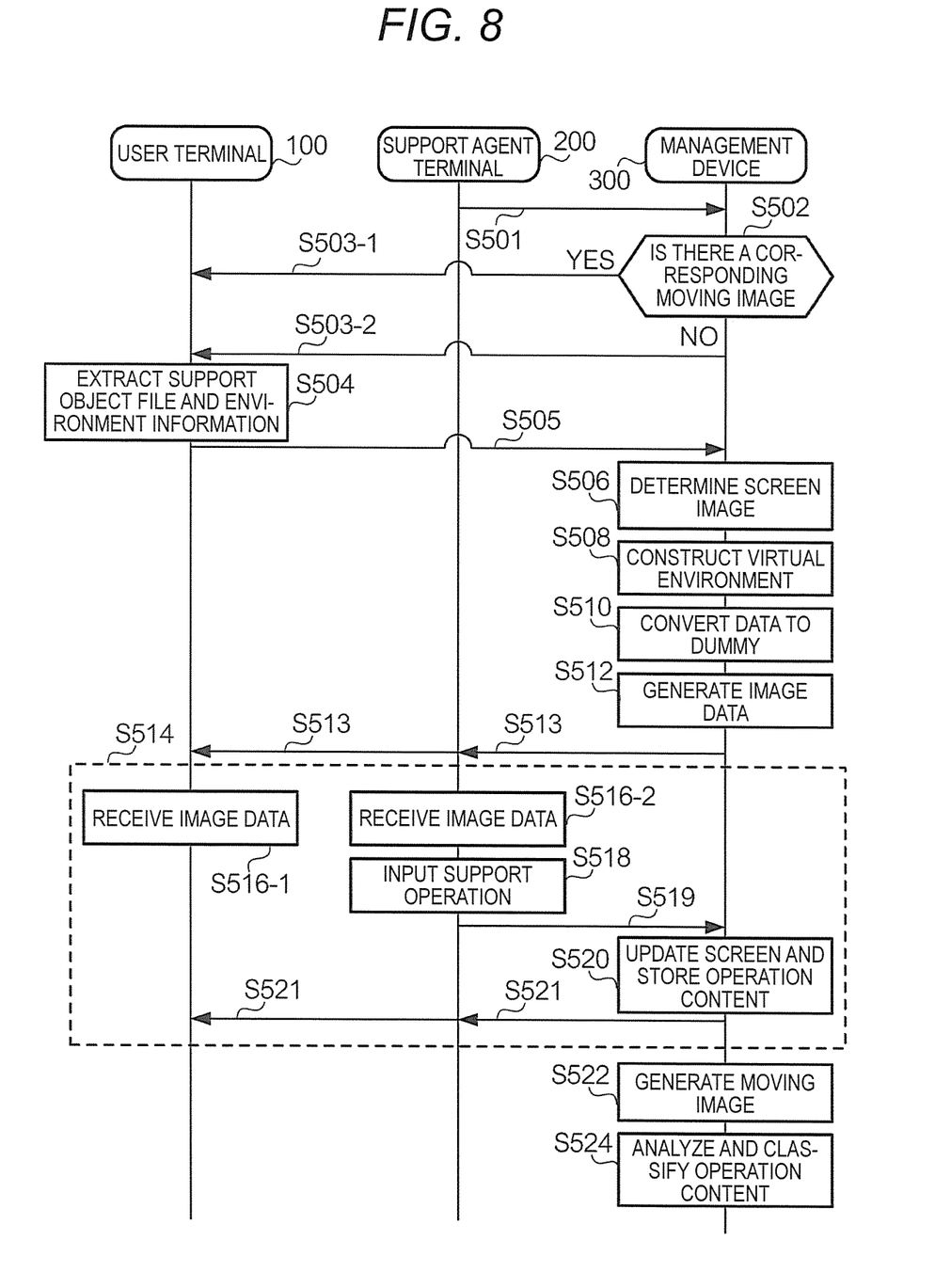
FIG. 8 is a drawing illustrating an operation in the operation support system.

FIG. 8 illustrates an operation in the operation support system 10. The user receiving operation support telephones a call center and transfers the content of the operation support to be received, such as a point of query, to the support agent. The support agent who hears the point of query or the like inputs the keywords while operating the support agent terminal 200 and transmits the point of query to the management device 300 (S501). The management device 300 checks whether a moving image corresponding to the point of query of the user is stored in the memory 340 based on the keywords (S502). In a case where a corresponding moving image is not present, the management device requests the support object file and environment information from the user terminal 100 (S503-2). In the case where a corresponding moving image is present, the moving image data is transmitted to the user terminal 100 (S503-1). In this case, in a case where the user tentatively views the moving image and the user senses that the query is not resolved, the message of the fact thereof is transmitted from the user terminal 100 to the management device 300, and the management device 300 requests the support object file of and the environment information when the message is received.

The user terminal 100 extracts the support object file and the environment information (S504) and transmits the support object file and the environment information to the management device 300 when the request is received from the management device 300 (S505). The management device 300 generates the screen data based on the received support object file and the software information AS1 included in the received environment information (S506). Subsequently, the management device 300 constructs the virtual environment based on the software information AS1 and the hardware information AS2 (S508). The dummy processor 322 checks the body of the support object file and executes the dummy conversion, as necessary (S510). The image data in which the dummy conversion process is reflected is generated (S512) and transmitted to at least either of the user terminal 100 or the support agent terminal 200 (S513).

Below, support is performed based on the provided image on the support agent terminal 200 with the user while the support agent views the screen represented by the provided image data (S514). For example, in a case where the image data is provided only to the support agent terminal 200 (S516-2), the supporter understands the operation (such as input of numbers with a keyboard or selection of an object with a mouse) that is the response to the query from the user taken by telephone or the like, and inputs the operation on the support agent terminal 200 along with describing the operation content by telephone or the like (S518). The management device 300 generates image data so that the content of the operation is reflected on the screen and stores the image data in the memory 340 (S520) when a signal matching the input operation content is received from the support agent terminal 200 (S519). The generated image data is transmitted to the same terminal as the terminal that is the transmission destination in S513 (S521). The supporter obtains a feeling on the user terminal 100 as though performing operation of the support agent terminal 200.

In a case where the screen data is also provided to the user terminal 100 (S516-1), the content of the screen of the user terminal 100 is updated and the operation is sequentially reflected when there is an operation carried out on the support agent terminal 200. Accordingly, it is possible for the user to ascertain the content of the operation performed by the supporter in real time.

The management device 300 erases the constructed virtual environment when an operation support termination request is received from the support agent terminal 200 (or user terminal 100). The management device 300 performs image processing, such as the image data of plural still images generated related to support being connected and generates one moving image data item (S522). The management device 300 analyzes and classifies or the like the operation content, applies the tag information to the moving image data based on the environment information and operation content, and stores the tag information associated with the moving image data (S524).

In a related-art technology, there may be security concerns such as an operator of a support center terminal unintentionally browsing individual information on a user terminal or data on the user terminal being corrupted due to misoperation.

In contrast, according to the exemplary embodiment, it is possible to remotely support the operation of a user without the support agent terminal 200 accessing the terminal of the user of the user terminal 100. Thus, the support object file on the user terminal 100 is not corrupted by another person. In this case, since a screen according to the environment of the user terminal 100 is applied to the support agent, it is not necessary that the terminal operated by the support agent have similar resources (software resources, hardware resources) as the user terminal 100. Additionally, since the dummy conversion is carried out, as necessary, on the information viewed by the support agent, it is possible to prevent information that is to be kept secret from leaking to another person. Since the moving image is provided to the support prior to the support agent performing the operation according to the content of the support, it is possible for the support by the operation support agent to be omitted.

Figure 9A:
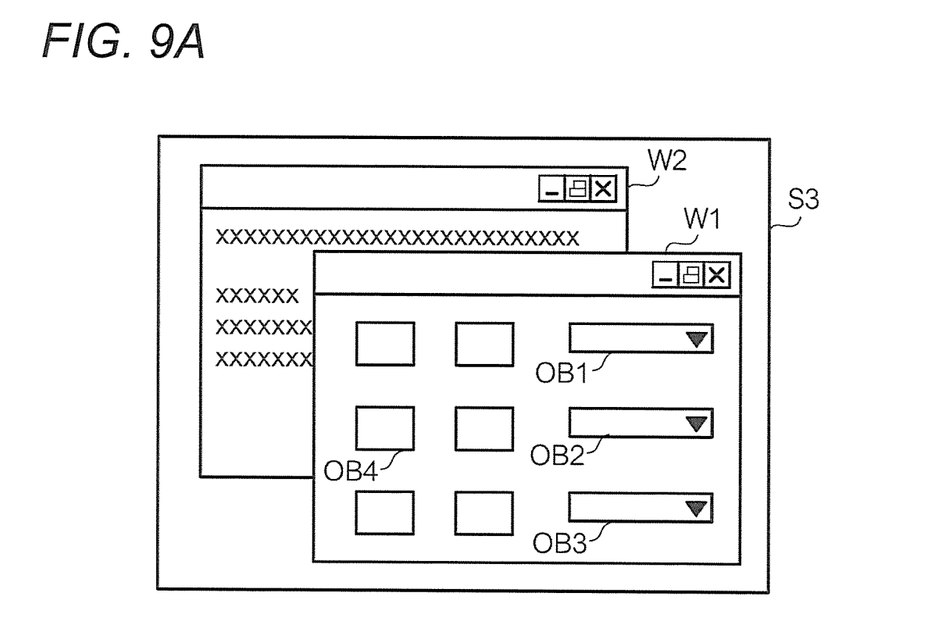
FIG. 9A and FIG. 9B are drawings showing another example of a provided screen.
Figure 9B:
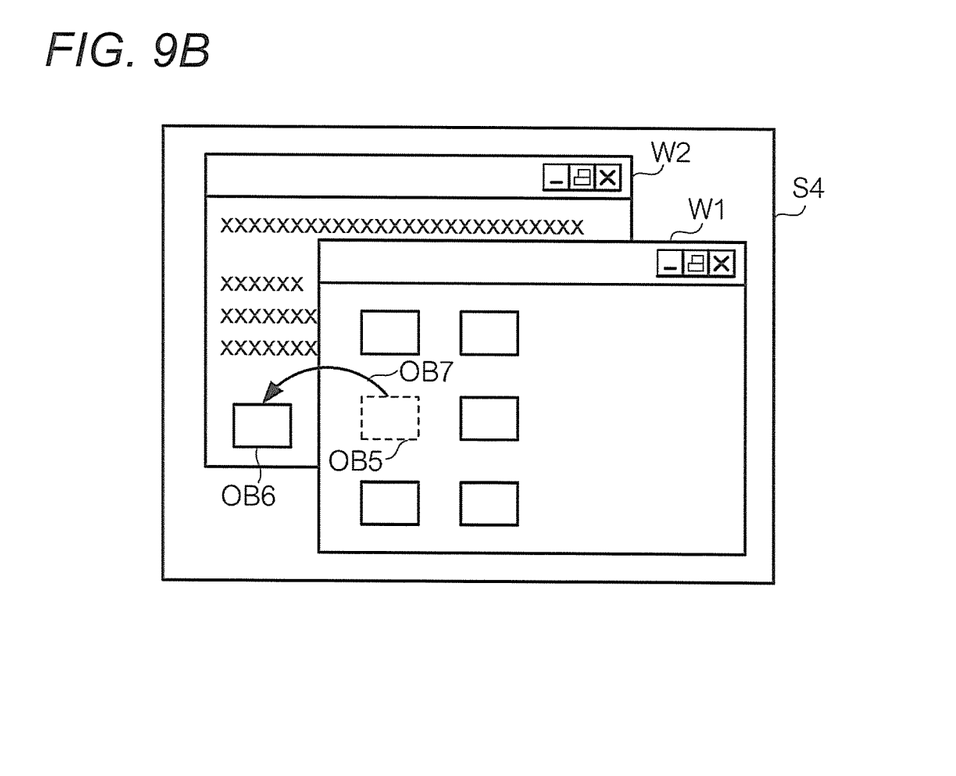

The process executed in the screen generator 321 is not limited to the object of hiding information, and may be used with the object making the operation content easier to understand and transfer. Objects according to the arrangement of objects that form the screen displayed when the support object file is executed by the user terminal 100 may be included in the screen that represents the image data generated by the management device 300. Specifically, image processing that includes abstractions, improvements, and additions such as objects (such as windows, tabs, icons, menu bases, soft buttons, input fields, and pull-down tags) that form the screen is performed. When the support obtained by a user is a drag operation of the mount such as OB4 in the window W1 being moved to the window W2 in a case where the screen S3 illustrated in FIG. 9A is displayed by the user terminal 100 when the support object file is initially executed, the image data generated by the management device 300 represents a screen in which the OB5, OB6 and OB7 that are objects for easily understanding and transferring the content of a drag operation are added and the OB1, OB2 and OB3 that are unrelated to the operation are deleted as in the screen S4 in FIG. 9B.

A hardware configuration other than that in FIG. 2 may be adopted in order to realize the operation support method of the exemplary embodiment. The support agent terminal 200 and the management device 300 may be installed as an integrated hardware device.

The support agent terminal 200 may not be provided. For example, the support agent may be seated adjacent to the user of the user terminal 100, and may initiate the operation while viewing the screen of the user terminal. That is, a unit into that the support agent inputs the operation and a screen on which the input results are reflected to be seen by the support agent may be provided in the operation support system 10. In this case, it is also possible for the user, similarly to the support agent, to receive the description while viewing the screen generated to be suitable operation support.

In summary, the operation support system is provided with a terminal and a support management device, in which the support management device may include a receiving unit that receives environment information that indicates a file pertaining to operation support received by a user of a terminal and an operation environment of the terminal from the terminal; a screen generator that generates image data of a screen referenced when performing the operation support based on the received file and environment information; and an output unit that outputs the generated image data. The functions of the receiving unit, generator, and output unit are realized by the processor of the support management device executing a program.

Similarly, the terminal of the exemplary embodiment may be provided with a transmission unit that transmits files pertaining to the operation support received by the user and operation information indicating the operation environment of the terminal to the support management device, and a receiving unit that receives image data of the screen referenced when performing operation support from the support management device. The function of the transmission unit and receiving unit are realized by the processor of the terminal executing a program. The programs may be stored on a storage medium and acquired or downloaded via the Internet and installed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An operation support apparatus, comprising:
   a receiving unit that receives a file and environment information from a user terminal, wherein
      the file pertains to operation support that a user of the user terminal is to receive and is capable of being used by an application program included in software resources of the user terminal,
      the environment information indicates an operation environment of the user terminal and includes at least software information pertaining to the software resources of the user terminal, and
      the operation support pertains to a method of using the file with the application program included in the software resources of the user terminal;
   a processor that constructs a virtual environment of the user terminal for utilization by a support agent terminal based on the environment information, processes access requests by the support agent terminal with respect to the virtual environment, and determines a drawing content from input received by the support agent terminal;
   a screen generator that generates image data including an estimated screen displayed on the user terminal in a case where the file is executed in the operation environment, receives information from the processor indicating operations realized on the support agent terminal, updates the image data so that the operation support is reflected on the screen, and adds objects to the generated image data for understanding the operations realized on the support agent terminal; and
   an output unit that outputs the generated image data to at least one of the user terminal and the support agent terminal.

2. The operation support apparatus according to claim 1, wherein the output unit transmits the image data to the support agent terminal operated by an operation support agent.

3. The operation support apparatus according to claim 1, wherein the output unit transmits the image data to the user terminal.

4. The operation support apparatus according to claim 1, wherein the image data include information in which at least a portion of the information included in the file is replaced.

5. The operation support apparatus according to claim 1, wherein the screen represented by the image data includes an object according to characteristics of a placement of an object that forms a screen displayed on the terminal when the file is executed by the terminal.

6. The operation support apparatus according to claim 1, further comprising:
   a memory that stores the image data generated in the virtual environment and output to the support agent terminal in response to an input received by the support agent terminal.

7. The operation support apparatus according to claim 6, wherein the image data is a movie that indicates operation content of the operation support agent.

8. The operation support apparatus according to claim 7,
   wherein the receiving unit receives an operation support request prior to acquisition of the file and the environmental information, and
   wherein the operation support apparatus further comprises a transmission unit that transmits movie data having content of the operation support pertaining to the received request to the terminal.

9. The operation support apparatus according to claim 1, wherein the environment information designates:
   an operating system of the terminal; and
   at least the application program that operates on the operating system and is able to execute the file.

10. An operation support method, comprising:
    receiving a file and environment information from a user terminal, wherein
       the file pertains to operation support that a user of the user terminal is to receive and is capable of being used by an application program included in the resources of the user terminal,
       the environment information indicates an operation environment of the user terminal and includes at least software information pertaining to the software resources of the user terminal, and
       the operation support pertains to a method of using the file with the application program included in the software resources of the user terminal;
    constructing a virtual environment of the user terminal for utilization by a support agent terminal based on the environment information;
    processing access requests by the support agent terminal with respect to the virtual environment;
    determining a drawing content from input received by the support agent terminal;
    generating image data including an estimated screen displayed on the user terminal in a case where the file is executed in the operation environment;
    receiving information indicating operations realized on the support agent terminal;
    updating the image data so that the operation support is reflected on the screen;
    adding objects to the generated image data for understanding the operations realized on the support agent terminal; and
    outputting the generated image data to at least one of the user terminal and the support agent terminal.

11. A non-transitory computer readable medium storing a program causing a computer to execute a process for operation support, the process comprising:
    receiving a file and environment information from a user terminal, wherein
       the file pertains to operation support that a user of the user terminal is to receive and is capable of being used by an application program included in the resources of the user terminal,
       the environment information indicates an operation environment of the user terminal and includes at least software information pertaining to the software resources of the user terminal, and
       the operation support pertains to a method of using the file with the application program included in the software resources of the user terminal;
    constructing a virtual environment of the user terminal for utilization by a support agent terminal based on the environment information;
    processing access requests by the support agent terminal with respect to the virtual environment;

determining a drawing content from input received by the support agent terminal;
generating image data including an estimated screen displayed on the user terminal in a case where the file is executed in the operation environment;
receiving information indicating operations realized on the support agent terminal;
updating the image data so that the operation support is reflected on the screen;
adding objects to the generated image data for understanding the operations realized on the support agent terminal; and
outputting the generated image data to at least one of the user terminal and the support agent terminal.

12. The operation support apparatus of claim 1, wherein the screen generator further removes from the generated image data objects that are unrelated to the operations realized on the support agent terminal.

\* \* \* \* \*